April 27, 1937.  R. GOLPHIN  2,078,679
FENDER
Filed Jan. 29, 1936
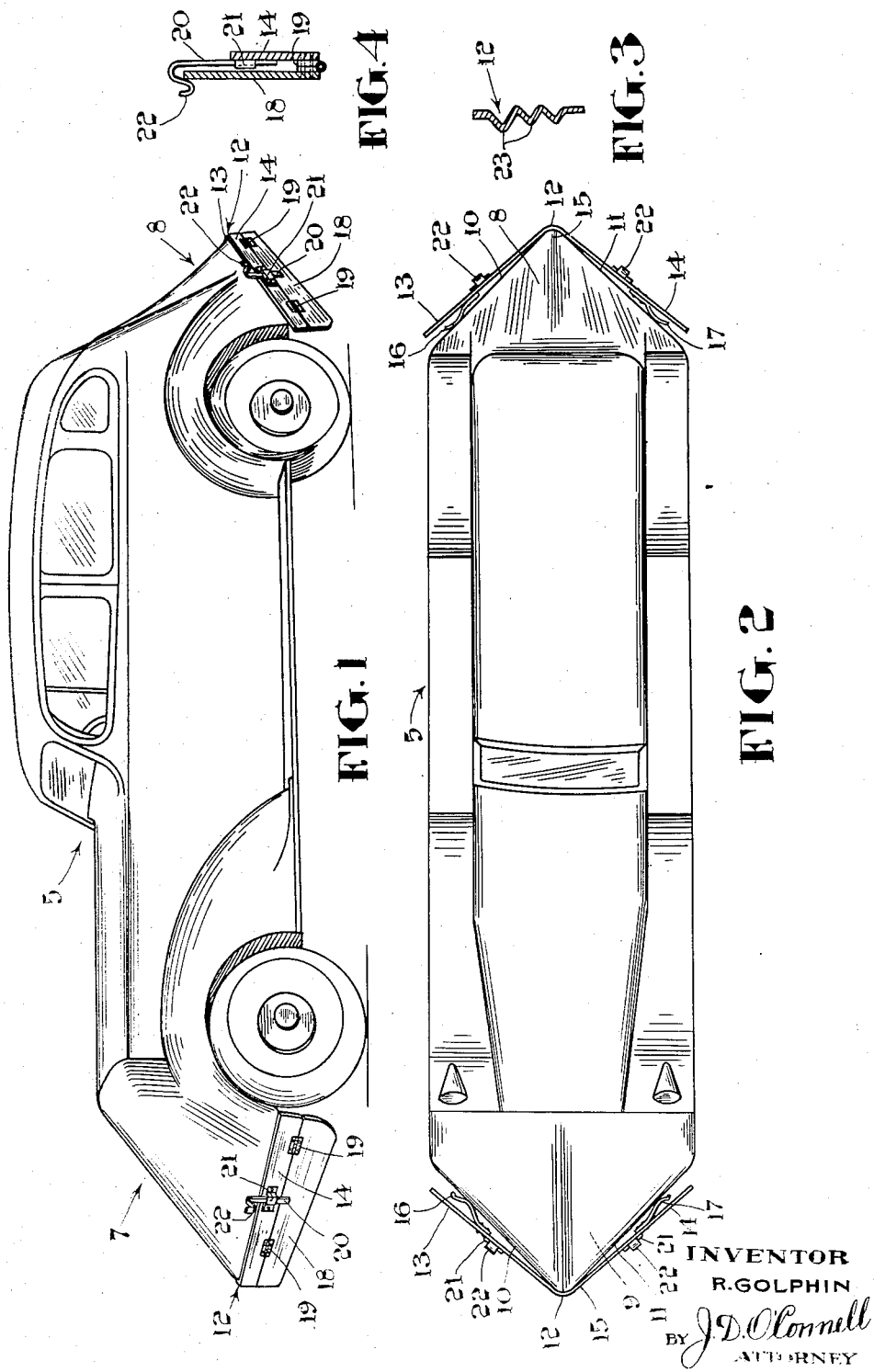
INVENTOR
R. GOLPHIN
BY J.D.O'Connell
ATTORNEY Patented Apr. 27, 1937

2,078,679

UNITED STATES PATENT OFFICE 2,078,679

FENDER

Robert Golphin, Montreal, Quebec, Canada

Application January 29, 1936, Serial No. 61,299

3 Claims. (Cl. 293—55)

This invention relates to improvements in fenders for automobiles, trucks or busses.

The principal feature resides in the provision of a fender which, by its deflecting action, will minimize the damage caused when the fender strikes or is struck by another object.

Another feature consists in merging the improved fender construction with the front and rear ends of an automobile or other vehicle body in such manner as to provide an attractive stream-line effect.

A further feature consists in designing the improved fender construction so that, in the case of an automobile, it provides a stream-line effect at the front and back which enables the automobile to be handled to better advantage in heavy traffic or when parking in a narrow space. Where the stream-line effect is resorted to solely for safety or deflecting purposes it need only be provided at the front of the automobile.

Proceeding now to a more detailed description reference will be had to the accompanying drawing, in which—

Fig. 1 is a perspective view of an automobile equipped with front and back fenders designed in accordance with this invention.

Fig. 2 is a top plan view of the automobile appearing in Fig. 1.

Fig. 3 is a detailed view showing a slight modification with respect to the shape of the bumper bars forming part of the improved fender construction.

Fig. 4 is a sectional view through one of the bumper bars, showing the manner in which a flap extension hinged to the bumper bar is secured in a raised or inoperative position.

Referring more particularly to the drawing, 5 designates an automobile equipped at the front and rear with my improved fenders generally indicated at 7 and 8. Each fender comprises a V or wedge-shaped sheet metal structure 9 presenting inclined sides 10 and 11. The front fender 7 is preferably formed as an integral extension merging with the hood portion of the body 5 to produce the stream-line effect shown in Figs. 1 and 2. A similar stream-line effect is obtained at the rear of the automobile by making the fender 8 as an integral continuation of the rear wall of the body.

The sloping sides 10 and 11 of each fender are preferably set at an angle of approximately 90° with respect to each other so that the deflecting action of these sides will tend to considerably diminish the damage resulting from collisions.

The lower edge of each fender is guarded by a V-shaped bumper bar 12 presenting side arms 13 and 14 which are preferably set at an angle of approximately 100° with respect to each other. The apices of the bumper bars 12 are secured to the apices 15 of the fenders 7 and 8 in any suitable manner that will permit the side arms 13 and 14 of the bumper bars to move toward the inclined fender surfaces 10 and 11 when struck by an object. The free ends of the arms 13 and 14 are normally held away from the fender surfaces 10 and 11 by means of suitable springs 16 and 17 which, in the present instance, comprise curved strips of springy sheet metal. It will be apparent, however, that the springs 16 and 17 may be replaced by coil springs, rubber blocks or other forms of cushioning elements.

In the present instance each bumper bar 12 has been shown as a one-piece V-shaped bar made of spring steel and having a slight radius or curvature at the juncture of the arms 13 and 14. It will be understood, however, that the arms of each bar may be made as separate elements having their inner ends hingedly connected at the apex of the fender structure with which the bars are associated. It is also preferred to provide the arms 13 and 14 of each bumper bar with depending flap extensions 18 hinged thereto as indicated at 19. The hinge connections are preferably made so that the flap extensions are prevented from swinging inwardly out of vertical alignment with arms 13 and 14 but are capable of being swung outwardly and upwardly to inoperative positions against the front surfaces of said arms.

When disposed in the position shown in Fig. 1 each flap extension 18 is held from swinging outwardly by the lower end of a flexible spring strip 20 which is secured in a suitable bracket 21 carried by the bumper bar to which the flap extension is hinged. The upper end of the spring strip 20 is bent to provide a hook 22 by means of which the flap extension may be held in an upwardly swung or inoperative position as shown in Fig. 4. As shown in Fig. 3 each of the bumper bars may be provided with longitudinal corrugations 23 which are effective to resist the tendency of the front end of the automobile to climb in the case of a head-on collision. If the collision is between two cars equipped with these corrugated bumper bars the bars of one car will tend to interlock with those on the other car to prevent the aforesaid climbing.

When equipped with fenders and bumper bars designed in accordance with this invention there is less danger of an automobile being badly wrecked by colliding with a post or tree since the inclined sides of the fenders and bumper bars will cause the automobile to glide to one side or the other. In the case of a head-on collision between two automobiles the deflecting action due to the V-contour of the bumper bars and fenders will cause the automobiles to glide apart without causing a great deal of damage. Also, when the automobile strikes a pedestrian the blow will be a glancing one due to the V-contour of the bumper bars and fenders. If the person struck should happen to be knocked down he or she will be pushed to one side by one or the other of the inclined flap extensions 18.

A further advantage of the present invention is that by reason of the V or pointed wedge-shape provided at the front and rear of the automobile the latter may be parked in narrow spaces or handled in heavy traffic with greater ease as compared with automobiles equipped with fenders or bumpers of known design.

From the standpoint of safety, it is not absolutely essential that the rear of the automobile body be stream-lined and provided with bumper bars as described herein. If desired, the back of the body may be of conventional or any other desired construction.

Having thus described my invention what I claim is:—

1. A fender of the character described comprising a V-shaped metal structure, a bumper bar resiliently supported in front of the lower edge portion of each inclined side of the structure and flap extensions hinged to the lower edge of the bumper bars.

2. A fender of the character described comprising a V-shaped metal structure, a bumper bar resiliently supported in front of the lower edge portion of each inclined side of the structure, and flap extensions hinged to the lower edges of the bumper bars by hinge connections permitting said extensions to be swung to an inoperative position against the front sides of the bumper bars and means for releasably securing said extensions in the last mentioned position.

3. A fender of the character described comprising a V-shaped metal structure, a bumper bar resiliently supported on front of the lower edge portion of each inclined side of the structure, and flap extensions hinged to the lower edges of said bumper bars, means normally holding said extensions in alignment with the bumper bars, said means being yieldable to permit swinging of the extensions to an inoperative position against the front sides of the bumper bars, and means for releasably holding the extensions in the last mentioned position.

ROBERT GOLPHIN.